United States Patent Office 3,422,012
Patented Jan. 14, 1969

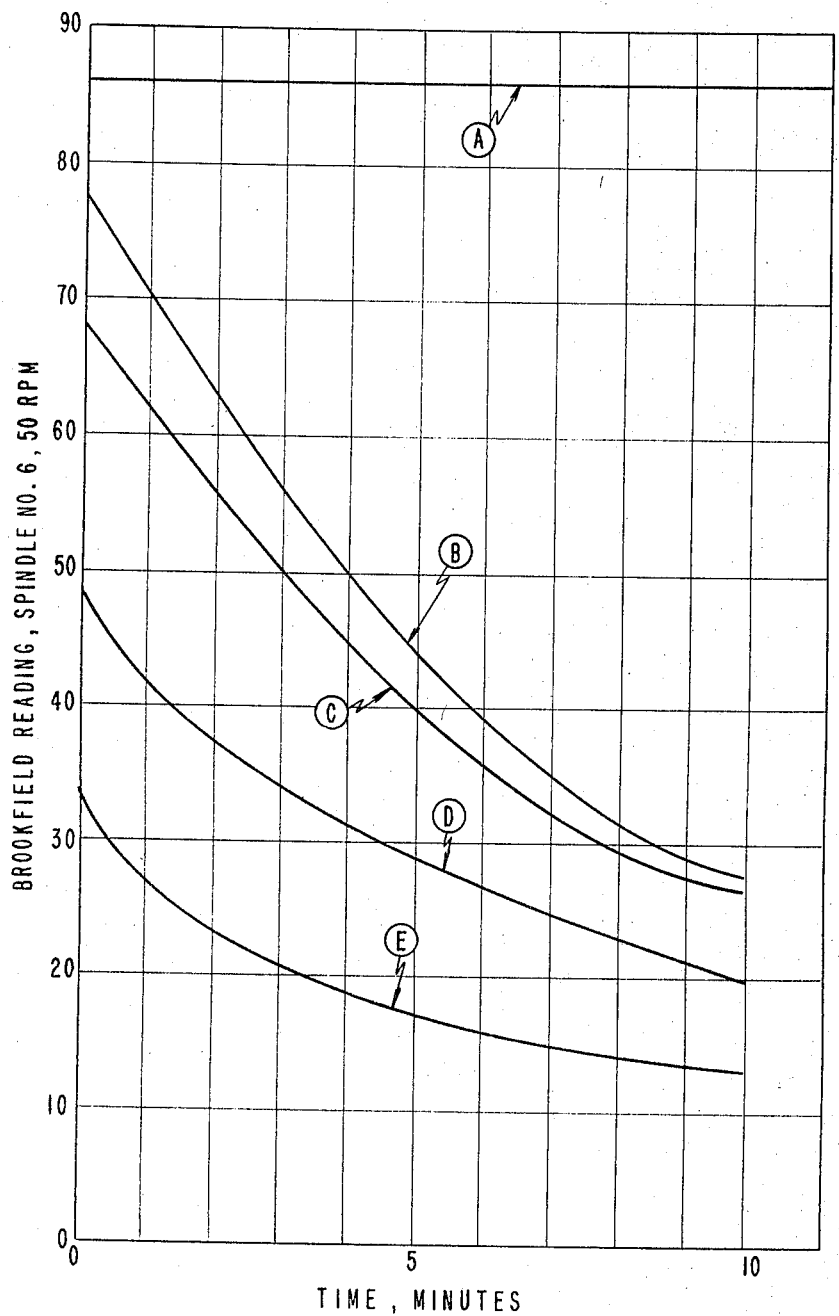

3,422,012
NON-THIXOTROPIC OIL
Jack R. Hopper and Blaine G. Corman, Baytown, Tex.,
assignors to Esso Research and Engineering Company
Filed Aug. 15, 1966, Ser. No. 572,383
U.S. Cl. 252—28
Int. Cl. C10m 1/10
10 Claims

ABSTRACT OF THE DISCLOSURE

A pseudoplastic, non-thixotropic viscous mixture is formed by the combination of a highly aromatic, high-boiling hydrocarbon oil and a finely divided pyrogenic silica. The aromatic hydrocarbon content of the oil is at least 80 weight percent, and the boiling range is from 600° F. to 800° F., with a 50% point of at least 665° F. The pyrogenic silica is admixed with the aromatic hydrocarbon oil in proportions from 3 to 20 parts by weight of pyrogenic silica for each 100 parts by weight of the aromatic hydrocarbon.

The mixture is found to be non-thixotropic, contrary to the common experience which shows that oils thus thickened are thixotropic in nature.

---

The present invention relates to a pseudoplastic, non-thixotropic composition. More particularly, the present invention is directed to a pseudoplastic, non-thixotropic mixture of a high-boiling aromatic hydrocarbon concentrate and a pyrogenic silica. In its most specific aspects, the present invention relates to a mixture of an aromatic hydrocarbon concentrate boiling within the range of 600–800° F., and having a 50% point of at least 665° F., with 3 to 20 parts by weight of a finely divided pyrogenic silica.

The use of pyrogenic silica as a thickening agent is well known. However, the use of this material has heretofore invariably been found to produce a thixotropic mixture. A thixotropic fluid is one which, at a constant shear rate, decreases in viscosity with increasing time of shear, but which returns to the original viscosity when the shear conditions are terminated. The mixtures are also pseudoplastic. A non-Newtonian fluid for which the apparent viscosity decreases with increasing shear rate is called a pseudoplastic fluid. Previously, mixtures of pyrogenic silica with oil produced non-Newtonian fluids which were both pseudoplastic and thixotropic. The present invention is directed to a mixture which is pseudoplastic but which is non-thixotropic.

The decrease in viscosity with time at constant shear rates reduces the utility of a thickened mixture where an extremely high viscosity is required. Further, this reduction with time requires the use of more thickening agent to obtain a workable viscosity after the passage of a finite time. The present invention allows a reduction of thickening agent to be used for a desired viscosity, as well as providing fluids of a higher viscosity which do not lose viscosity with time. Uses of the present invention will be found in high-speed lubricating applications (greases and gear oils), protective coatings, plastic fabrications, and metal fabrication.

The present invention employs a finely divided pyrogenic silica as a thickening agent. This material is commercially available under the trade name "Cab-O-Sil," manufactured and sold by the Cabot Corporation of Boston, Mass. Typical properties of three types of pyrogenic silica sold by the Cabot Corporation are given below in Table I.

TABLE I.—TYPICAL PROPERTIES OF THREE MAIN GRADES OF CAB-O-SIL [1]

|  | Cab-O-Sil M-5 | Cab-O-Sil H-5 | Cab-O-Sil EH-5 |
|---|---|---|---|
| Silica Content [2] | 99.8% | 99.8% | 99.8%. |
| Moisture Content | 1.5% | 4.0% | 5.0%. |
| Ignition Loss [3] | 1.0% | 2.0% | 2.5%. |
| Metallic Oxides | 0.1% | 0.1% | 0.1%. |
| pH | 4.0 | 3.9 | 3.8. |
| Surface Area | 200 m.²/gram | 325 m.²/gram | 390 m.²/gram. |
| Average Particle Size | 0.012 micron | 0.007 micron | 0.007 micron. |
| Particle Shape | Spherical | Spherical | Spherical. |
| Number of Particles Per Gram | $4.4 \times 10^{17}$ | $2.1 \times 10^{18}$ | $2.0 \times 10^{19}$. |
| Specific Gravity | 2.2 | 2.2 | 2.2. |
| Loose Bulk Density | 2.3 lb./cu. ft. | 2.3 lb./cu. ft. | 2.3 lb./cu. ft. |
| Refractive Index | 1.46 | 1.46 | 1.46. |
| X-ray Structure | Amorphous | Amorphous | Amorphous. |

[1] Other grades of Cab-O-Sil are available with specific modifications of some of the above properties.
[2] Excludes physically adsorbed water.
[3] Includes chemically combined water.

The pyrogenic silica is made by a vapor phase process: the high temperature hydrolysis of silicon tetrachloride at 1100° C. As can be seen by advertence to Table I, the silica produced has an extremely high purity, high surface area, small particle size, and low bulk density. The particles are spherical and are thought to associate within a fluid by reason of hydrogen bonding, trapping portions of the fluid in the resulting "chicken-wire" structure. Upon agitation or shear, the "chicken-wire" structure breaks down and then reforms after cessation of agitation. This provides the thixotropic action above referred to.

The viscosity of the mixture after addition of the pyrogenic silica depends upon the nature of the liquid, the concentration of the pyrogenic silica, the degree of dispersion, and the presence of various additives which promote the hydrogen bonding of the pyrogenic silica spherules, all as is well known to those skilled in the art. The use of additives reduces the amount of pyrogenic silica which is required to obtain the same viscosity and improves the stability of the thickened mixture (extending its shelf life). It is thus contemplated that a portion of the pyrogenic silica may be in part replaced by additives, or the silica may be supplemented by additives having the effects above discussed without departing from the spirit of the present invention. The present invention offers an unexpected variant of the pyrogenic silica-thickened oil as is shown in the attached drawing wherein the sole figure compares the thixotropicity of various types of oil when employed in oil-pyrogenic silica mixtures.

Referring to the figure, it is seen that the mixture of the present invention (identified as "Curve A") is horizontal, showing no decrease in viscosity with time.

Curves B, C, D and E represent mixtures with other oils not having the high aromaticity and high boiling range of the present oil. Note that there is a distinct and severe decline in viscosity with time at a constant shear rate (50 r.p.m.). This figure will be discussed in more detail in connection with the examples subsequently given.

The aromatic hydrocarbon concentrate which provides the unobvious non-thixotropic mixture when combined with pyrogenic silica is obtained as follows. A crude oil, for example coastal crude, is employed as the ultimate source. A coastal crude may have the following analysis.

TABLE II.—ANALYSIS OF A TYPICAL COASTAL CRUDE

|  | Data on Crude |
|---|---|
| Gravity, °API | 26.3 |
| Sulfur, Percent Dietert | 0.22 |
| Flash, °F., P.M. | R.T. |
| S.U. Viscosity at— | |
| 100° F | 71 |
| 80° F | 98 |
| 60° F | 172 |
| 40° F | 302 |
| Reid Vapor Pressure, lb | 2.5 |
| Pour Point, °F | −70 |
| Neutralization value, D664 | 1.40 |
| Hydrocarbon Anal., LV Percent: | |
| C₂ and Lighter | |
| C₃ | 0.1 |
| i-C₄ | 0.1 |
| n-C₄ | 0.1 |
| i-C₅ | 0.2 |
| n-C₅ | 0.1 |

DATA ON CUTS

| | | | | | | | |
|---|---|---|---|---|---|---|---|
| Distillation Range of Cut, °F | C₃–250 | 250–375 | 375–530 | 530–650 | 650–850 | 850–1050 | 1,050+ |
| Range of Cut, LV percent | 0.3–2.9 | 2.9–8.1 | 8.1–30.9 | 30.9–51.9 | 51.9–77.5 | 77.5–92.4 | 92.4–100 |
| Yield, LV percent | 2.6 | 5.2 | 22.8 | 21.0 | 25.6 | 14.9 | 7.6 |
| Gravity, °API | 59.0 | 43.9 | 31.9 | 27.8 | 23.0 | 20.5 | 12.9 |
| Refractive Index, n_D at 67° C | | | | 1.4707 | 1.4870 | 1.4958 | |
| Sulfur, percent | 0.0011 | 0.015 | 0.057 | 0.115 | 0.250 | 0.305 | 0.65 |
| Aniline Point, °F | | 125 | 126 | 142 | 166 | 200 | 300 |
| Viscosity, SUS at 210° F | | | | | 43.0 | 108.0 | |
| Conradson Carbon | | | | 0.01 | 0.06 | 0.50 | 12.6 |
| Type Analysis: | | | | | | | |
| Aromatics, percent | | 11.6 | 23.5 | | 33 | 35 | |
| Saturates, percent | | 88.4 | 76.5 | | 67 | 65 | |

The coastal crude is fractionated and a stream boiling within the range from about 500° F. to about 800° F. is obtained which has about 35% aromatic hydrocarbons therein. This stream is mildly hydrogenated (hydrofined), then solvent extracted, utilizing phenol containing 6% water as the solvent, at a treat rate of about 125%, to obtain a raffinate and an extract. The extract is further processed by re-extraction with more dilute phenol, followed by redistillation and mild hydrogenation of the extract from re-extraction.

The re-extracted, rerun and rehydrofined extract has an inspection as follows.

TABLE III

| Inspections: | Re-extracted, rerun, and rehydrofined extract |
|---|---|
| Gravity, °API | 11.7 |
| Specific Gravity at 60° F. | 0.9881 |
| Viscosity, SUS at 100° F. | 179.6 |
| Viscosity, SUS at 210° F. | 39.6 |
| Flash, O.C., °F. | 335 |
| Pour, °F. | −20 |
| Color, ASTM | 1.5 |
| Color, Tag-Robinson | 16 |
| Colorhold, Tag-Robinson (16 hrs. at 212° F.) | 11½ |
| Volatility, 3 hrs. at 325° F., percent | 2.80 |
| Aniline point, °F. | 36 |
| Refractive index, n_D at 67° C. | 1.5347 |
| Sulfur, wt. percent | 0.18 |
| Neutralization No., mg. KOH/g. | 0.0 |
| Molecular weight (average) | 249 |
| Analysis by silica gel, wt. percent: | |
| Saturates | 13.4 |
| Aromatics | 86.6 |
| Polar | 1.8 |
| Approx. boiling range, °F. | 600–750 |

ASTM distillation (10 mm. Hg corrected to 760 mm.):

| | |
|---|---|
| 5% off at, °F. | 628 |
| 10% off at, °F. | 637 |
| 20% off at, °F. | 648 |
| 30% off at, °F. | 655 |
| 40% off at, °F. | 664 |
| 50% off at, °F. | 673 |
| 60% off at, °F. | 682 |
| 70% off at, °F. | 693 |
| 80% off at, °F. | 703 |
| 90% off at, °F. | 722 |
| 95% off at, °F. | 740 |
| FBP, °F. | 792 |

This specific oil is the one used in the examples later given. Note the high boiling range and high aromaticity.

The aromatics concentrate contains at least about 80% aromatic materials, which will include indanes, indenes, naphthalenes, acenaphthenes, acenaphthylenes, phenanthrenes and anthracene. For some reason unknown to the inventors, this extract interacts with the pyrogenic silica to provide an exceptionally stable mixture which does not exhibit thixotropy, though it does exhibit pseudoplasticity.

The aromatic hydrocarbon concentrates which can be employed in the present invention must have at least 80 weight percent aromatic hydrocarbons, boil within the range from 600° F. to 800° F., and have a 50% point at least as high as 665° F. Preferably, the material has an API gravity of 11.7°, a viscosity of about 179.6 SUS at about 100° F., and about 39.6 SUS at 210° F. The average molecular weight of the preferred oil will be about 249, and it will have a 5% boiling point of about 628° F., a 50% point of about 673° F., and a 95% point of about 740° F. These points are determined by ASTM distillation (ASTM D-1160–61) carried out at 10 mm. pressure and then corrected to 760 mm. to obtain the above figures.

An analysis of the hydrocarbon concentrate by silica gel will show a preferred saturates content of about 13.4 weight percent and an aromatics content of about 86.6%, of which the polar aromatic compounds are about 1.8%. The silica gel analysis is carried out under procedures described as ASTM D–2007.

The mixture of the aromatic hydrocarbon concentrate with the pyrogenic silica is easily obtained by agitation of the oil and silica by any suitable means, such as a Hobart mixer.

In order to illustrate the present invention, the following experimental runs are presented.

Five oils were used in the evaluation. The identification and inspection of each oil is shown below in Table IV.

Referring to Table V, note that the slope of the "viscosity versus time curve" in Brookfield units per minute ranges from 4.0 to 7.8 for the other oils, but is 0.0 with the aromatic hydrocarbon concentrate of the present invention. Note that Oil No. 1, which contained only 64.4% aromatics, had the second highest slope. The data from

TABLE IV

|  | Present Invention | Oil No. 1 | Oil No. 2 | Oil No. 3 | Oil No. 4 | Oil No. 5 |
|---|---|---|---|---|---|---|
| Gravity, °API | 11.7 | 17.9 | 24.8 | 17.1 | 27.2 | 32.1 |
| Viscosity, SUS: |  |  |  |  |  |  |
| 100° F | 179.6 | 114.5 | 100.5 | 126.5 | 204 | 150.1 |
| 210° F | 39.6 | 37.9 | 37.9 | 38.4 | 45.1 | 43.4 |
| Color, ASTM | 1.5 | −0.5 | −0.5 | 1.5 | 1 | 1 |
| Flash, COC, °F | 335 | 310 | 335 | 330 | 390 | 410 |
| Boiling range, 5%/95% | 628/740 | 610/760 | 610/760 | 610/760 | 610/760 | 720/860 |
| Clay Gel Analysis, ASTM D-2007: |  |  |  |  |  |  |
| Saturates | 13.4 | 35.6 | 64.5 | 70.3 | 81.2 | 84.2 |
| Aromatics | 86.6 | 64.4 | 35.5 | 28.4 | 18.7 | 14.9 |
| Polar | 1.8 | 0.0 | 0.0 | 1.3 | 0.1 | 0.9 |
| Asphaltenes | 0.0 | 0.0 | 0.0 | 0.0 | 0.0 | 0.0 |
| In the Figure: Curve | A |  |  | B | C | D |

The oils ranged in composition from aromatic to paraffinic, in viscosity from 200 to 100 SUS at 100° F., and from 38 to 45 SUS at 210° F. The variance in API gravity was from 11.7 to 32.1° API. Of particular interest, they ranged in aromatics content from 14.9 to 86.6 weight percent.

In each of the examples 200 g. of oil were mixed with 12 g. of type M-5 Cab-O-Sil. Thus, it is seen that for every 100 parts by weight of oil, 6 parts by weight of Cab-O-Sil were used. The components were mixed one minute at the slow speed and 4 minutes at the medium speed in a Hobart mixer. The mixture was allowed to set overnight before viscosity measurements were made. The viscosity measurements were made with a Brookfield Synchrolectric Viscometer type RVF using spindle No. 6.

In each case the apparent viscosity was evaluated as a function of time. The mixture which has the largest decrease in viscosity for a given time period, of course, is the most thixotropic. At constant shear rates, readings were taken at 0.5, 1, 3, 5 and 10 minutes after the instrument was started. These readings were made at speeds of 10, 20, 50 and 100 r.p.m. with three of the mixtures, and at 50 and 100 r.p.m. with the other mixtures. Thus, in addition to determining the thixotropic characteristics, the affect of mixing speeds (schear rates) on the viscosity was also established to illustrate the pseudoplasticity of the mixtures.

Each of these runs is plotted in the figure. Further, the data are tabulated below in various tables.

TABLE V.—THE THIXOTROPIC CHARACTER OF OIL-CAB-O-SIL MIXTURES

|  | Curve in Figure | Brookfield Viscometer Reading at 50 r.p.m. | | Slope of Vis. vs. Time Curve, Brookfield Units/min. |
|---|---|---|---|---|
|  |  | 30 sec. | 3 min. |  |
| Present Invention | A | 86.0 | 86.0 | 0.0 |
| Oil No. 1 |  | 52.5 | 34.0 | 7.4 |
| Oil No. 2 |  | 55.0 | 35.5 | 7.8 |
| Oil No. 3 | B | 74.0 | 56.0 | 7.2 |
| Oil No. 4 | C | 64.0 | 50.0 | 5.6 |
| Oil No. 5 | D | 46.0 | 34.0 | 4.8 |
| Mineral Oil | E | 30.0 | 20.0 | 4.0 | whence the values in Table V were obtained are shown below in Table VI.

TABLE VI.—BROOKFIELD VISCOMETER READINGS FOR OIL-CAB-O-SIL MIXTURES

| Oil Designation | r.p.m. | ½ | 1 | 3 | 5 | 10 |
|---|---|---|---|---|---|---|
| Present Invention | 100 | 86 | 89 | 89 | 90 | 87 |
|  | 50 | 84 | 87 | 87 | 88 | 84 |
|  | 20 | 69 | 69 | 67 | 65 | 66 |
|  | 10 | 46 | 50 | 53 | 54 | 54 |
| Oil No. 1 | 100 | 62 | 58.5 | 42.5 | 32.25 | 23 |
|  | 50 | 55.5 | 50.75 | 34 | 26 | 17.25 |
| Oil No. 2 | 100 | 67 | 58.5 | 39 | 31 | 15.5 |
|  | 50 | 48 | 41 | 26 | 32 | 23 |
| Oil No. 3 | 100 | 85.5 | 85 | 76.5 | 62.5 | 47.5 |
|  | 50 | 77.5 | 74 | 53 | 44.5 | 27 |
| Oil No. 4 | 100 | 82 | 84.5 | 69 | 61 | 44.5 |
|  | 50 |  | 62 | 49.5 | 39 | 27.5 |
| Oil No. 5 | 100 | 53 | 49 | 38 | 33 | 26 |
|  | 50 | 44 | 42 | 34 | 28 | 19 |
|  | 20 | 35 | 31 | 22 | 18 | 14 |
|  | 10 | 30 | 25 | 15 | 11 | 8.5 |
| Mineral Oil | 100 | 35 | 31 | 26.5 | 24 | 19 |
|  | 50 | 30 | 27 | 20 | 17 | 13 |
|  | 20 | 21 | 18 | 13 | 10.5 | 7.5 |
|  | 10 | 19 | 18 | 12 | 9 | 7 |

Referring to Table VI, note particularly that with the present invention the viscosity did not decrease as a function of time. At 100 r.p.m., the viscosity of ½ minute was 86 Brookfield units, where at 10 minutes it was 87 Brookfield units. At 50 r.p.m. the reading was identical at 84, both at ½ minute and at 10 minutes. Similar results are seen, within experimental error, at 20 and 10 r.p.m. The other oils, contrarily, exhibit radical decreases in the Brookfield reading with respect to time.

Having disclosed the present invention in detail, along with a specific example of the preferred aromatic hydrocarbon concentrate and pyrogenic silica mixture, what is intended to be covered by the present application should be limited not by the specific examples herein given, but rather by the appended claims.

We claim:

1. A pseudoplastic, non-thixotropic viscous mixture consisting essentially of (1) one hundred parts by weight of an aromatic hydrocarbon concentrate having the following characteristics:

an aromatic hydrocarbon content of at least 80 weight percent and a boiling range within the limits from 600° F. to 800° F., with a 50% point of at least 665° F., and (2) from 3 to 20 parts by weight of a finely-divided pyrogenic silica having a surface area of at least 200 square meters per gram.

2. A mixture as in claim 1 wherein the mixture contains about 6 parts of said pyrogenic silica.

3. A mixture as in claim 1 wherein said pyrogenic silica has:
   a surface area of about 200 m./gram,
   an average particle size of 0.012 micron, and
   a loose bulk density of 2.3 lb./cu. ft.

4. A mixture as in claim 3 wherein the mixture contains about 6 parts of said pyrogenic silica.

5. A pseudoplastic, non-thixotropic viscous mixture consisting essentially of
   (1) one hundred parts by weight of an aromatic hydrocarbon concentrate having the following characteristics:
      API gravity, about 11.7°;
      Viscosity, SUS at 100° F., about 179.6; SUS at 210° F., about 39.6;
      Average molecular weight, about 249;
      Analysis by silica gel, weight percent:
         Saturates, about 13.4;
         Aromatics, about 86.6;
         Polar compounds, about 1.8,
      and a boiling range within the limits from 600° F. to 800° F., with a 50% point of at least 665° F., and
   (2) from 3 to 20 parts by weight of a finely-divided, pyrogenic silica having a surface area of at least 200 square meters per gram.

6. A mixture as in claim 5 wherein the mixture contains about 6 parts of said pyrogenic silica.

7. A mixture as in claim 5 wherein said pyrogenic silica has:
   a surface area of about 200 m.²/gram,
   an average particle size of 0.012 micron, and
   a loose bulk density of 2.3 lb./cu. ft.

8. A mixture as in claim 7 wherein the mixture contains about 6 parts of said pyrogenic silica.

9. A pseudoplastic, non-thixotropic, viscous mixture consisting essentially of
   (1) one hundred parts by weight of an aromatic hydrocarbon concentrate having the following characteristics:

| | |
|---|---|
| Gravity, °API | 11.7 |
| Specific gravity at 60° F. | 0.9881 |
| Viscosity: | |
|   SUS at 100° F. | 179.6 |
|   SUS at 210° F. | 39.6 |
| Flash, O.C., ° F. | 335 |
| Pour, ° F. | −20 |
| Color, ASTM | 1.5 |
| Color, Tag-Robinson | 16 |
| Colorhold, Tag-Robinson (16 hrs. at 212° F.) | 11½ |
| Volatility, 3 hrs. at 325° F., percent | 2.80 |
| Aniline point, ° F. | 36 |
| Refractive index, $n_D$ at 67° C. | 1.5347 |
| Sulfur, wt. percent | 0.18 |
| Neutralization No., mg. KOH/g. | 0.0 |
| Molecular weight (average) | 249 |
| Analysis by silica gel, wt. percent: | |
|   Saturates | 13.4 |
|   Aromatics | 86.6 |
|   Polar compounds | 1.8 |
| ASTM distillation (10 mm. Hg corrected to 760 mm.): | |
|   5% off at, ° F. | 628 |
|   10% off at, ° F. | 637 |
|   20% off at, ° F. | 648 |
|   30% off at, ° F. | 655 |
|   40% off at, ° F. | 664 |
|   50% off at, ° F. | 673 |
|   60% off at, ° F. | 682 |
|   70% off at, ° F. | 693 |
|   80% off at, ° F. | 703 |
|   90% off at, ° F. | 722 |
|   95% off at, ° F. | 740 |
| FBP, ° F. | 792 | and (2) from 3 to 20 parts by weight of pyrogenic silica having the following characteristics:

| | |
|---|---|
| Silica content (excludes physically adsorbed water) percent | 99.8 |
| Moisture content percent | 1.5 |
| Ignition loss (includes chemically combined water) percent | 1.0 |
| Metallic oxides percent | 0.1 |
| pH | 4.0 |
| Surface area m.²/gram | 200 |
| Average particle size micron | 0.012 |
| Particle shape | Spherical |
| Number of particles per gram | $4.4 \times 10^{17}$ |
| Specific gravity | 2.2 |
| Loose bulk density lb./cu. ft. | 2.3 |
| Refractive index | 1.46 |
| X-ray structure | Amorphous |

10. A mixture as in claim 9 wherein the mixture contains about 6 parts of said pyrogenic silica.

References Cited

UNITED STATES PATENTS

| | | | |
|---|---|---|---|
| 2,514,331 | 7/1950 | Morway | 252—21 |
| 2,583,605 | 1/1952 | Sirianni et al. | 252—21 |
| 3,123,560 | 3/1964 | Hallowell | 252—58 |

FOREIGN PATENTS 659,409  3/1963  Canada.

DANIEL E. WYMAN, *Primary Examiner.*

IRVING VAUGHN, *Assistant Examiner.*

U.S. Cl. X.R.

208—18; 106—14, 285; 72—42